United States Patent

Friederichs et al.

[15] 3,655,052

[45] Apr. 11, 1972

[54] FLUID CONTAMINATION MEASURING SYSTEM

[72] Inventors: Josef E. Friederichs; Edgar E. Friederichs, both of Pacific Palisades; Leo Weg, Los Angeles, all of Calif.

[73] Assignee: Alpha Advanced Systems, Inc., Inglewood, Calif.

[22] Filed: Feb. 6, 1970

[21] Appl. No.: 9,262

[52] U.S. Cl. ............................ 210/90, 210/93, 210/168
[51] Int. Cl. ........................................... B01d 33/06
[58] Field of Search ............ 210/85, 90, 93, 130, 131, 132, 210/168

[56] References Cited

UNITED STATES PATENTS

| 3,358,836 | 12/1967 | Schmitt | 210/168 X |
| 3,502,048 | 3/1970 | Bentzen et al. | 210/90 X |
| 3,099,546 | 7/1963 | Smallpeice | 210/85 X |
| 3,325,010 | 6/1967 | Sackett | 210/90 |
| 3,056,379 | 10/1962 | Thomas | 210/90 X |

Primary Examiner—John Adee
Attorney—William A. Kemmel, Jr.

[57] ABSTRACT

A fluid contamination measuring system having a sampling valve to continuously withdraw a representative portion of a fluid stream, a moveable filter for filtering at least some of such stream portion and moving proportionally to the cumulative amount of particles retained and a sensor for detecting such movement remotely.

6 Claims, 5 Drawing Figures

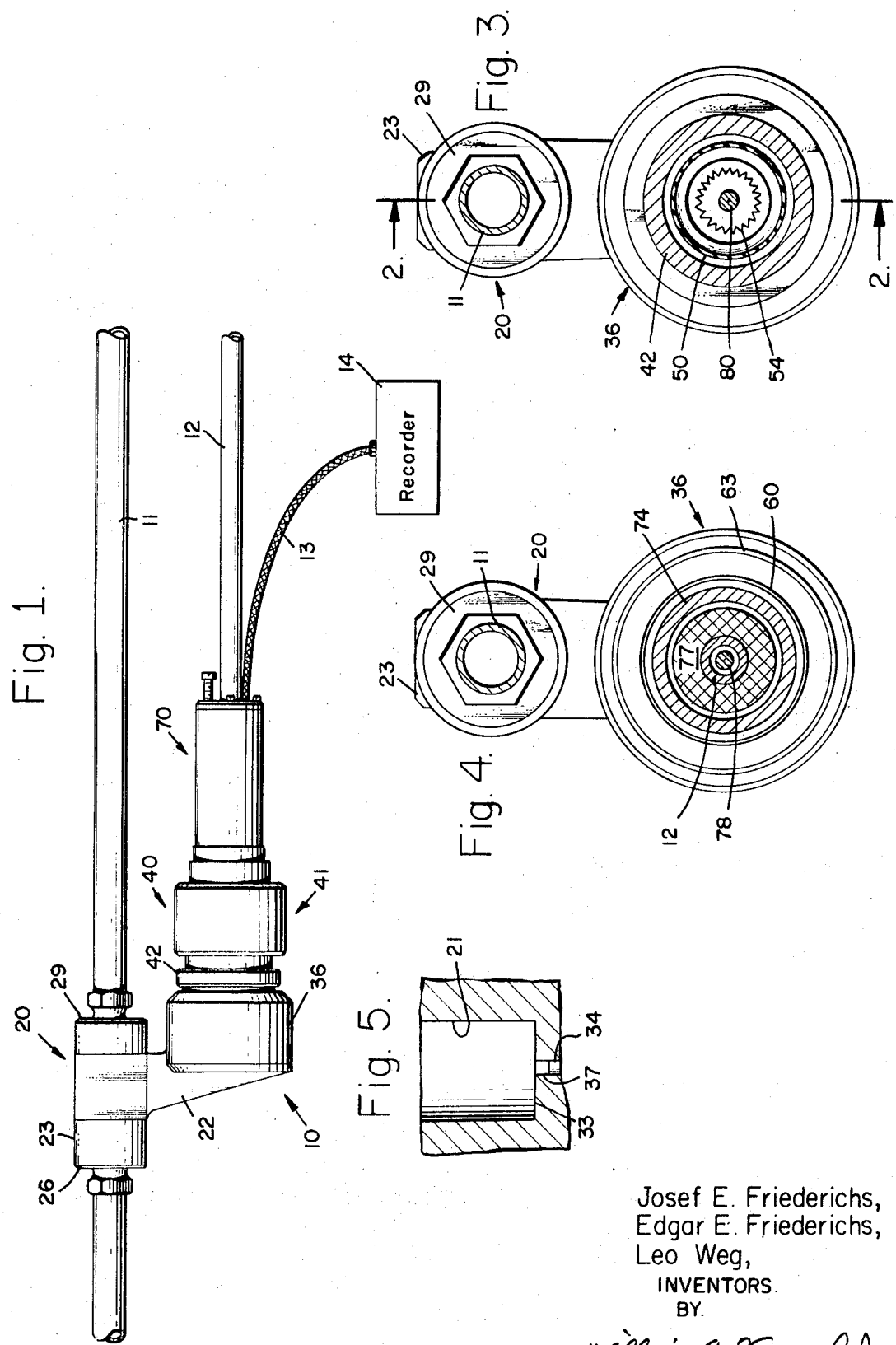

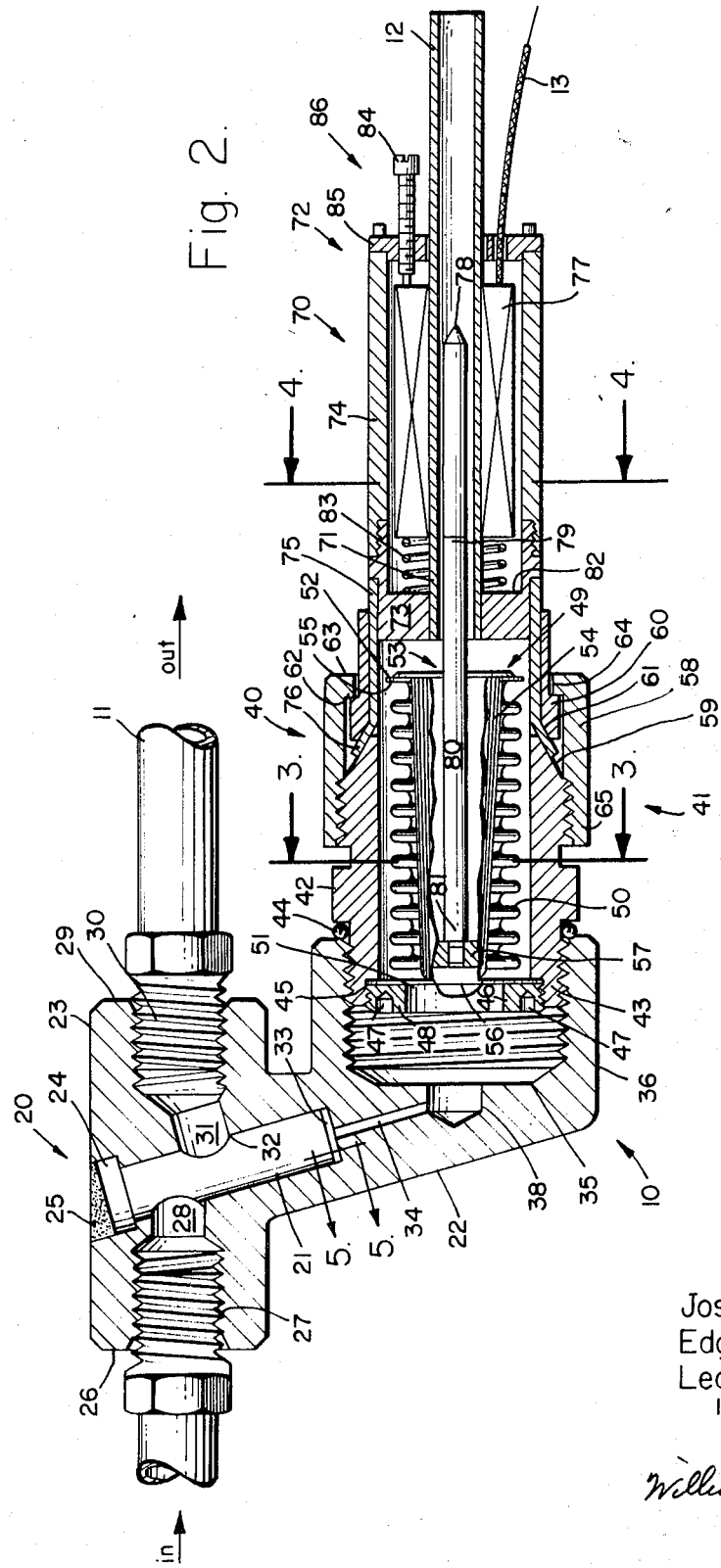

FLUID CONTAMINATION MEASURING SYSTEM

BACKGROUND OF THE INVENTION

In many fluid streams flowing in an enclosed conduit, it is of major importance that the degree of contamination of such fluid stream be known and controlled, such as in the lubricating system or the fuel supply system for an engine. Commonly, the impurities, particularly particle impurities, in such fluid stream are controlled by a filter which removes such particles while permitting relatively free circulation of the clean fluid stream. While such arrangement permits control of the contamination in the fluid stream for an undetermined amount of time, depending on such factors as the degree of contamination of the fluid stream, it does not provide the user of the system incorporating the fluid stream with any information as to the degree of contamination of the fluid stream. Consequently, in order to compensate for such lack of information, it is common in many systems such as the lubricating system in an automobile system, to simply change the filter element in relatively short intervals to insure that it does not become plugged. The obvious shortcomings of such arrangement have been recognized for many years, so, consequently, there have been a variety of improved systems developed to supply information with respect to the contamination of the fluid stream. Perhaps the most widely used of such improved systems, are systems wherein the degree of plugging of the filter is externally indicated and thus, the contamination of the fluid stream is thereby indicated. Examples of filter plugging indicators are illustrated in U.S. Pat. No. 3,216,571, issued to Whiting, et al., on Nov. 9, 1965, and U.S. Pat. No. 3,447,689, issued to George G. Solymar on June 3, 1969, where, in each case, the filter is moveable and such movement is related to the plugging of the filter. The movement of the filter in each case is indicated by a rod which extends through the filter enclosure so that the length of such extension indicates the plugging taking place. While such plugging indicator systems represent substantial improvement over many earlier systems, they still have a number of substantial problems and shortcomings, which have prevented their widespread use. The basic shortcoming of such improved systems is that they acquire the inclusion of a main filter in the system, so that they have no application where the fluid stream would not normally require a filter. Even if a main filter is normally included in the system being used, the use of the plugging of the main filter to indicate the contamination compromises both the successful utilization of the filter, as well as, the accurate indication of such plugging. For example, since filter movement is required to provide an indication of plugging, there are severe limitations on the design of the structure and operation of the filter unrelated to its main function of filtering the fluid stream. Likewise, since the indicator rod is dependent upon the movement of such main filter, relatively large movements are required to provide an indication of the plugging. Also, of necessity, the indicator rod is located with the filter whose location, in turn, is normally determined by other design factors, so that it is commonly, relatively difficult to easily observe or check the indicator rod. More important, when the plugging of the main filter is utilized to indicate the degree of contamination, at best it is possible only to indicate the current state of the system, so that no advance notice is possible. Most important, since the indicator rod in such improved systems extends through the filter enclosure, there is a leakage problem which can be quite severe depending on the fluid systems involved.

In response to such problems and shortcomings of the present fluid contamination measuring systems, an object of the present invention is a sensitive reliable system adapted to continuously sample and separately measure the cumulative particle contamination in a fluid stream flowing in a completely enclosed conduit.

Another object of the present invention is a fluid contamination measuring system which does not require a main filter in the system, or alternatively, operates independently of the main filter in the system.

Still another object of the present invention is a fluid contamination measuring system, which utilizes only a small portion of the fluid stream being measured so that the manipulation and utilization of the fluid stream is not significantly hindered.

Still another object of the present invention is a fluid contamination measuring system which permits the fluid stream to remain completely enclosed at all times and thus positively prevents leakage problems.

Still another object of the present invention is a fluid contamination measuring system which permits the display of the contamination information at a convenient location remote from the system being measured.

Other objects and advantages of the present invention will be readily apparent from the following description and drawings which illustrate a preferred exemplary embodiment of the present invention.

SUMMARY OF THE INVENTION

In general, the present invention involves a fluid contamination measuring system comprising a sampling valve means, adapted to continuously withdraw a small representative portion of a fluid stream flowing in a completely enclosed conduit. Connected to such sampling valve means is a moveable filter means adapted to receive and filter at least some of said fluid stream portion. The movement of such filter being proportional to the cumulative amount of particles retained thereon. Such filter means is connected to sensing means adapted to detect directly, but remotely, the movement of the filter means while passing the fluid stream portion through the completely enclosed sample conduit.

In order to facilitate understanding of the present invention, reference will now be made to the appended drawings of a preferred specific embodiment of the present invention. Such drawings, like the preceding summary, should not be construed as limiting the present invention which is properly set forth in the appended claims.

DESCRIPTION OF DRAWINGS

FIG. 1 is a plan view (partly schematic) of the fluid contamination measuring system of the present invention in combination with a recorder adapted to record and/or display the output signal of the measuring system.

FIG. 2 is an axial cross-sectional view of the measuring system portion of FIG. 1, taken along the lines 2 — 2 of FIG. 3.

FIG. 3 is a cross sectional view of the measuring system of FIG. 2, taken along the lines 3 — 3 of FIG. 2.

FIG. 4 is a cross-sectional view of the measuring system of FIG. 2, taken along the lines 4 — 4 of FIG. 2.

FIG. 5 is a cross-sectional view of the measuring system of FIG. 2, taken along the lines 5 — 5 of FIG. 2.

DESCRIPTION OF THE PREFERRED EMBODIMENT OF THE PRESENT INVENTION

As illustrated in FIGS. 1 – 5, the fluid contamination measuring system 10 is adapted to continuously sample a fluid stream flowing in a completely enclosed conduit 11, by continuously withdrawing a representative portion thereof and subsequently, returning the same through a completely enclosed sample conduit 12 while generating an electrical output signal through a lead 13 to a recorder 14 adapted to record and/or display such output signal and using a conventional power supply (not shown). The fluid contamination measuring system 10 comprises a sampling valve means 20 adapted to continuously withdraw a small representative portion of the fluid portion flowing in the conduit 11 and moveable filter means 40 connected to said sampling valve means 20 and adapted to receive at least some of such fluid stream portion. Such moveable filter means 40 is adapted for movement proportional to the cumulative amount of the particles retained thereon. In addition, the measuring system 10 includes sensing means 70, adapted to detect directly, but remotely, the movement of the filter means 40, while passing the fluid stream portion through a completely enclosed sample conduit 12 and returning it to the fluid reservoir (not shown).

The sampling valve means 20 comprises a cylindrical chamber 21 in a first housing 22 extending from the top 23 of the first housing 22 to its central portion and extending at an obtuse angle to the direction of the fluid flow through the sampling valve means 20. The upper end 24 of the chamber 21 is recessed and threaded to receive a plug 25 so that the chamber 21 may be closed during the operation of the measuring system 10 but ready access thereto may be obtained by removal of the plug 25 for inspection and cleaning when the measuring system 10 is not in service. In the first side 26 of the housing 22 of the sampling valve means 20 is an inlet port 27 adapted to be connected to the conduit 11 and opening to the chamber 21. The inlet port 27 has a neck 28 of smaller cross-sectional area than the remaining portion of the inlet port 27 adjoining the chamber 21. In the second side 29 of the housing 22 of the sampling valve 20 is an outlet port 30 opening to the chamber 21 and adapted to be connected to the fluid conduit 11. The outlet port 30 has a neck 31 adjoining the chamber 21, at a location 32 offset from the axis of the fluid conduit 11, while the remaining portion of the outlet port 30, is co-axial with the fluid conduit 11. In addition, the axis of the neck 31 extends at an acute angle to the direction of fluid flow in the conduit 11. Extending from and connected to the bottom 33 of the chamber 21 is an orifice 34 which connects to a sample outlet port 35 adjacent to the bottom 36 of the housing 22. Connecting the orifice 34 to the bottom 33 of the chamber 21 is an inlet slot 37 adapted to slice off a representative portion of the turbulent fluid flow in the chamber 21. The orifice 34 extends co-axially with the chamber 21 to facilitate cleaning and inspection of the orifice 34, as well as to facilitate its manufacture. Also, the orifice 34 connects to the sample outlet port 35 by a central recess 38 in the sample outlet port 35 so that the sample portion is introduced centrally into the sample outlet port 35 to promote a uniform flow distribution in the filter means 40.

Connected to the sample outlet port 35 of sample valve means 20, are the moveable filter means 40, which are adapted to receive and filter at least some of the fluid stream sample portion with the movement of the filter means being proportional to the cumulative amount of particles retained thereon. The moveable filter means 40 includes a second housing 41 having a cylindrical tube 42 whose first end 43 is threaded into the sample outlet port 35 and forms a sealed connection therewith by means of a gasket 44. Threaded into a recess 45 in the first end 43 of the tube 42 is a ring 46, having sockets 47 formed in its outer face 48 which facilitate its attachment to the tube 42. Clamped into the recess 45 by the ring 46 are base spring means 49 formed out of a cylindrical bellows 50 whose first open end 51 is fixed and sealed by the ring 46 and which extends co-axially with the tube 42. Mounted on the second end 52 of the bellows 50 are retainer filter means 53 formed out of a pleated cone 54 which is co-axially mounted in the bellows 50 with its base 55 joined and sealed to the second end 52 of the bellows 50 and its apex 56 adjacent to the sample inlet port 35. The apex 56 is more sharply tapered than the remaining portion of the cone 54 to promote the uniform flow pattern along the length of the cone and has a base plate 57 joined thereto. The housing 41 also includes a sleeve 58 attached to the exterior of the tube 42, adjacent its tapered second end 59. The sleeve 58 encircles a collar 60 having a tapered surface 61 adapted to be forced into a wedging and sealing relationship with the tapered second end 59 of the tube 42 by the sleeve 58. Thus, the shoulder 62 in the second end 63 of the sleeve 58 engages the shoulder 64 on the collar 60 and forces the collar 60 adjacent to the second end 59 of the tube 42 when the first end 65 of the sleeve 58 is threaded onto the tube 42.

The sensing means 70 includes a completely enclosed sample conduit 12 adapted to return the fluid stream portion to the fluid stream in the fluid conduit 11. The first end 71 of the sample fluid conduit 12 extends through and is attached to the third housing 72 having a cylindrical base 73 threaded into a cylindrical top 74. Extending from the base 73 into the second housing 41 is a grommit 75 having a flared outer end 76 adapted to be champed between the second end 59 of of the tube 42 and the tapered surface 61 of the collar 60 to form a sealed connection therewith. Within the housing 72 but surrounding the end 71 of the sample conduit 12 is a transformer coil 77. Within the end 71 of the sample conduit 12 and the transformer coil 77 is a transformer core 78 fixed to the outer end 79 of a rod 80, whose inner end 81 is fixed to the base plate 57 of the cone 54. Adjoining the bottom 82 of the base 73 is a helical spring 83 which biases the transformer coil 77 into contact with a set screw 84 threaded through the cover plate 85 of the cylindical top 74. Thus, the helical spring 83 and the set screw 84 form a position adjustment means 86 adapted to select the location of the transformer coil 77 with respect to the transformer core 78.

The recorder 14 utilizes conventional electrical components to display the change in the position of the core 78 and is powered by a conventional power supply (not shown). Thus the electrical circuit utilized in the recorder 14 includes an ocillator providing a carrier signal to the linear variable differential transformer coil 77. The output signal from the transformer coil 77 is fed to a phase sensitive demodulator whose output is a DC voltage and polarity proportional to the amplitude and direction of the displacement of the transformer core 78. The demodulator signal is amplified in an amplifier and then displayed on DC voltmeter.

The materials used for constructing the present invention depend on its particular application except, of course, the transformer core must consist of magnetic material such as soft iron and the transformer housing must consist of relatively non-magnetic materials such as certain stainless steels and aluminum. The remaining portions of the present invention may utilize high strength metals such as stainless steel or nickel-bronze alloys for high pressure applications or brass or aluminum for moderate and low pressure applications.

The operation of the fluid contamination measuring system 10 is adapted to continuously sample and separately measure the cumulative particle contamination in a fluid stream flowing in a completely enclosed conduit. Before operating it, the recorder 14 is calibrated to a reference point, such as zero by adjustment of the set screw 84 to properly position the transformer coil 74 with respect to the transformer core 78. After such calibration the measuring system 10 is connected to the fluid conduit 11 by joining the inlet port 27 and outlet port 30 into such conduit and the sample conduit 12 is also joined into conduit 11. When the fluid stream in conduit 11 reaches the port 27 of the sampling valve means 20, it is injected into the chamber 21 with increased velocity and turbulence by the neck 28. Also, the obtuse angle which the chamber 21 makes with the fluid stream directs the fluid stream at least partially toward the bottom 33 of the chamber 21. Likewise, the offset location 32 and acute angle of the neck 31 of the outlet port 30 promotes turbulence in the chamber 21 and aids in directing the fluid stream toward the bottom 33 of the chamber 21. At the bottom 33 of the chamber 21, the slot 37 effectively slices a representative portion of the turbulent fluid flow and directs it through the orifice 34 and into the recess 38 in the central portion of the outlet port 35. Such fluid stream sample portion is then directed along the pleated filter cone 54 within the bellows 50 and passes therethrough into the interior of the filter cone 54. During the passage of the sample fluid portion through the filter cone 54, particles in the sample fluid portion are retained on the filter cone and pressure is exerted on the bellows 50 supporting the filter cone 54. As particles are collected by the filter cone 54 the pressure difference increases across the cone causing a corresponding pressure increase on the bellows 50. Such pressure difference increase causes the bellows 50 to extend and displace the transformer core 78 with respect to the transformer coil 77. Such displacement, in turn, results in a voltage change which is displayed by the recorder 14 to the operator of the system. Thus, the continuous indication is given of the contamination of the fluid system and the degree of such contamination is displayed.

It will be appreciated that many other specific embodiments of the present invention will be obvious to one skilled in the arts in view of the disclosure of the preferred embodiment of the present invention. For example, the transformer core could be attached to the bellows rather than the filter cone or the filter cone could be reversed. Similarly, the transformer coil need not be concentric with the transformer core, but simply adjacent thereto. Also, the transformer coil may be the element which is displaced while the transformer core remains fixed.

There are many features in the present invention which clearly show the significant advance which the present invention achieves over the prior art. Consequently, only a few of the more outstanding features will be pointed out to illustrate the unexpected and unusual results obtained by the present invention. One feature of the present invention is that the fluid contamination measuring system utilizes a separate continuous sampling branch circuit of the main fluid system to independently indicate the degree of contamination without affecting the design and operation of the main fluid system and without requiring a filter in the main fluid system. Another feature of the present invention is that the contamination measuring system is a completely enclosed system which eliminates the usual sealing and leakage problems encountered in the present indicator systems and permits a more sensitive measurement of the degree of contamination. Still another feature of the present invention is that it permits display of the degree of contamination at a point remotely located with respect to the fluid system itself and this location can be selected for convenience without regard to the other requirements of the design and operation of the fluid system.

It will be understood that the foregoing description and drawings are only illustrative of the present invention, and it is not intended that the invention be limited thereto. All substitutions, alterations and modifications of the present invention which come within the scope of the following claims or to which the present invention is readily susceptible without departing from the spirit and scope of this disclosure are considered a part of the present invention.

We claim:

1. A sensitive, reliable fluid contamination measuring system, adapted to continuously sample and separately measure the cumulative particle contamination in a fluid stream flowing in a completely enclosed conduit, comprising:
   a. sampling valve means adapted to continuously withdraw a small representative portion of a fluid stream flowing in a completely enclosed conduit;
   b. moveable filter means connected to said sampling valve means and adapted to receive a filter at least some of said fluid stream portion, the movement of said filter means being proportional to the cumulative amount of particles retained;
   c. sensing means connected to said filter means and adapted to detect directly and display remotely all movement of said filter means while passing said fluid stream through a completely enclosed sample conduit, said sensing means comprising (i) a completely enclosed sample conduit connected to said moveable filter means and said conduit and adapted to receive the filtered fluid stream portion and return it to the fluid stream, (ii) a transformer coil outside and adjacent to said sample conduit and (iii) a transformer core within said sample conduit and affixed to said moveable filter means.

2. A fluid contamination measuring system as stated in claim 1, wherein said sampling valve means comprises:
   a. a chamber and an axially offset inlet port and outlet port connected by said chamber and adapted to form turbulent fluid flow in said chamber;
   b. an orifice connected to said chamber; and,
   c. a sample outlet port connected to said orifice.

3. A fluid contamination measuring system as stated in claim 2, wherein the orifice in said sampling valve means includes an inlet slot adapted to slice off a representative portion of the turbulent fluid flow.

4. A fluid contamination measuring system as stated in claim 1, wherein said moveable filter means comprises:
   a. base spring means; and,
   b. retainer filter means mounted on said base spring means.

5. A fluid contamination measuring system as stated in claim 4, wherein said base spring means is a cylindrical bellows connected to said sample outlet port, and said retainer filter means is a pleated cone coaxially mounted in said bellows with its apex adjacent to said sample inlet port.

6. A fluid contamination measuring system as stated in claim 1, wherein said transformer coil includes position adjustment means adapted to select its location with respect to said transformer core.

* * * * *